(12) United States Patent
Jörck

(10) Patent No.: US 6,409,125 B1
(45) Date of Patent: Jun. 25, 2002

(54) POSITIONING SYSTEM FOR A MEASURING INSTRUMENT ON A SATELLITE

(75) Inventor: Hartmut Jörck, Wiemersdorf (DE)

(73) Assignee: Astrium GmbH, Friedrichshafen (DE)

( * ) Notice: Subject to any disclaimer, the term of this patent is extended or adjusted under 35 U.S.C. 154(b) by 0 days.

(21) Appl. No.: 09/568,006

(22) Filed: May 10, 2000

(30) Foreign Application Priority Data

May 10, 1999 (DE) .......................................... 199 21 390

(51) Int. Cl.$^7$ ................................................ B64G 1/66
(52) U.S. Cl. ..................... 244/171; 310/90.5; 73/178 R
(58) Field of Search ........................... 244/171, 158 R, 244/164, 165, 166; 74/514, 516; 318/648, 632, 689, 580; 248/638, 589; 73/178 R

(56) References Cited

U.S. PATENT DOCUMENTS

| | | | | |
|---|---|---|---|---|
| 3,421,715 A | * | 1/1969 | Cohlan | 244/171 |
| 4,143,466 A | * | 3/1979 | Quermann | 33/327 |
| 4,170,904 A | * | 10/1979 | Fischell et al. | 244/171 |
| 4,408,740 A | * | 10/1983 | Kleber | 244/264 |
| 4,629,262 A | * | 12/1986 | Hamilton | 310/90.5 |
| 4,803,413 A | * | 2/1989 | Kendig et al. | 318/648 |
| 5,131,611 A | * | 7/1992 | Vollaro | 244/158 R |
| 5,334,965 A | * | 8/1994 | Dolgin | 335/216 |
| 5,654,549 A | * | 8/1997 | Landecker et al. | 250/332 |
| 6,158,964 A | * | 12/2000 | Gowrinathan | 244/171 |

FOREIGN PATENT DOCUMENTS

| | | |
|---|---|---|
| DE | 3024127 | 9/1983 |
| EP | 0569994 | 11/1993 |

* cited by examiner

*Primary Examiner*—Galen L. Barefoot
(74) *Attorney, Agent, or Firm*—Ladas & Parry

(57) ABSTRACT

Positioning system for a high-precision measuring instrument (1) in a support structure (2) of a satellite, in which the measuring instrument (1) can be moved freely with predetermined degrees of freedom within a space (3) provided in the satellite support structure (2). The measuring instrument (1) produces reference signals required by it for its inertial alignment, and is aligned with respect to a predetermined measurement target by a first positioning device (7). The satellite support structure (2) follows the motion of the measuring instrument (1) in order to overcome external disruptive forces and moments.

10 Claims, 2 Drawing Sheets

POSITIONING SYSTEM FOR A MEASURING INSTRUMENT ON A SATELLITE

FIELD OF THE INVENTION

The invention relates to a positioning system for a measuring device adapted for being carried on a satellite and particularly to an optical instrument or to an instrument for measuring inertial forces and moments, such as, an accelerometer.

The invention relates in particular to instruments carried on a satellite in which the requirements for alignment accuracy or positioning of the instrument are so high that the placement and positional control of the satellite can no longer provide the measurement signals necessary for this from external sensors, but rather, the signals must be provided directly from the very precise measurements of the measuring instrument for its own control.

BACKGROUND

Most scientific satellites and earth observation satellites contain optical instruments, which are aligned very precisely with a target, such as, a star in the case of astronomical satellites, or with a region of the earth. In order to produce precise data, from such satellites, deviations from predetermined trajectories must be minimized or at least the aiming trajectories must be reproducible. The alignment or position of the measuring instrument is subject to external disturbances such as gravitational variations, solar pressure, magnetic disturbances and several smaller effects, such as, Lorentzian forces. The bandwidth of the disturbances that are to be considered depends on the measurement precision to be obtained and in extreme cases, for example, for magnetic disturbances, this can amount to more that 100 Hz In order to control these disturbances, conventionally control elements such as gas jets reaction gears, (discrete or continuously operating) and the like are used. However, these, in turn, produce internal disruptions in the satellite itself. The bandwidth of these disturbances extends from the lowest frequencies in the sub-mHz region up to harmonics, which, for example, in the case of reaction gears, can have frequencies of several kHz. These mechanical disturbances are directly transferred to the measuring instrument via the satellite structure in conventional systems. Together with the external disturbances, they can lead to movements of the rigid body of the measuring instrument. In the case of large measuring instruments, such as telescopes, movements of the individual optical elements in the instrument relative to one another also must be taken into consideration in addition to the movement of the rigid body. These effects, in the case of optical instruments, lead to line-of-sight (LOS) movements and thus, among other things, to an undesired blurring of the images. In order to fulfill the goal of the mission, particularly in the case of high requirements for measurement precision, it is therefore necessary to minimize the influence of external and internal disturbances on the measuring device.

Disturbances of higher frequency are reduced according to the prior art by passive means for damping or isolating the sources of internal disruption from the satellite support of the utilized device. These passive means have only a limited lower bandwidth, and active means have recently been increasingly investigated for reducing structural vibrations, particularly for high-precision space interferometers. Further, magnetic means for isolating the utilized devices have been used in the case of microgravitational experiments. These active means suppress very well the effect of internal disturbances on the utilized devices in the high-frequency or intermediate-frequency ranges. However, they are not successful in the region of low frequencies, in which, however, a relatively rigid connection or coupling with the satellite structure still exists. The utilized device thus follows its movement. The magnitude of the satellite motion thus depends on the control precision that can be achieved and thus particularly both on the quality of the measurement signal obtained from the utilized device as well as the magnitude of external disturbances. Since the magnitude of the low-frequency satellite motion that occurs is a disadvantage for most applications, measures are necessary for limiting it.

SUMMARY OF THE INVENTION

It is therefore an object of this invention to provide a positioning system for high-precision satellite measuring instruments, which can substantially uncouple the instrument both from internal as well as from external disturbances especially in the low-frequency range.

The object is achieved by a positioning system for a high precision measuring instrument on a satellite, in which the positioning system comprises a support structure fixed to the satellite, said precision measuring instrument being freely movable with at least one degree of freedom within a space provided in said support structure, and a first positioning device operatively coupling said precision measuring instrument and said support structure to inertially align said measuring instrument and a target and cause said support structure to follow movement of said measuring instrument.

A clear increase in precision when compared with conventional systems results when a contact-free positioning of the measuring instrument is provided inside the satellite support structure, which is achieved in a manner that inertial travel of the measuring instrument is no longer produced by the primary control components (gas jets, reaction jets, etc.) of the satellite, but is made relative to the satellite and its support structure for the instrument. Since the satellite represents the main sources of disturbance, for example, primarily by production of magnetic dipole moments these are now isolated from the instrument. Also, isolated from the instrument are various external disturbances, such as, time-variable radiation pressure of the sun. Thus, the positioning control means for the instrument can, according to the invention, operate with lower power and thus achieve greater precision. That is, in contrast with satellite systems designed according to the prior art, here the chain of action has been reversed. The measuring instrument not only produces the measuring signals itself necessary for its inertial alignment, but is inertially aligned itself also as a "satellite" within the satellite support structure by means of a suitable control system. The satellite support structure now follows the movements of the measuring instrument as a screen against external disturbances of the measuring instrument. The control precision required for the satellite support structure is produced from the control means for positioning the instrument, i.e., the greater the control region of the positioning instrument, the less precise the control precision of the satellite. The degrees of freedom for which a decoupling between the satellite support structure and the positioning instrument depends on the respective application. Thus, in the cases of a standard optical instrument, only a decoupling of the rotational degrees of freedom will be necessary, while the translational degrees of freedom can be coupled relatively rigidly to the satellite support structure.

In the case of very high requirements for measurement precision, the changes in gravitational force between the measuring instrument and the satellite support structure must be minimized, because these can lead to increased requirements for the precision of the external control means of the satellite support structure.

Due to the extensive isolation of the measuring instrument from environmental influences, the movement of the measuring instrument becomes much "smoother", i.e., in particular, it has fewer low-frequency fluctuations than is the case of an instrument that is not decoupled. The measuring instrument can be controlled in a simple way and its inertial movement can also be better reconstructed on the ground.

The arrangement further clearly reduces the requirements for resolution capacity and freedom from disturbances of control systems in the satellite structure. In this way, it is also possible, depending on the individual case, to provide the use of conventional control components for the external control circuit of the satellite structure even in the case of very high requirements for the measurement precision of the measuring instrument.

DETAILED DESCRIPTION

Figure 1:
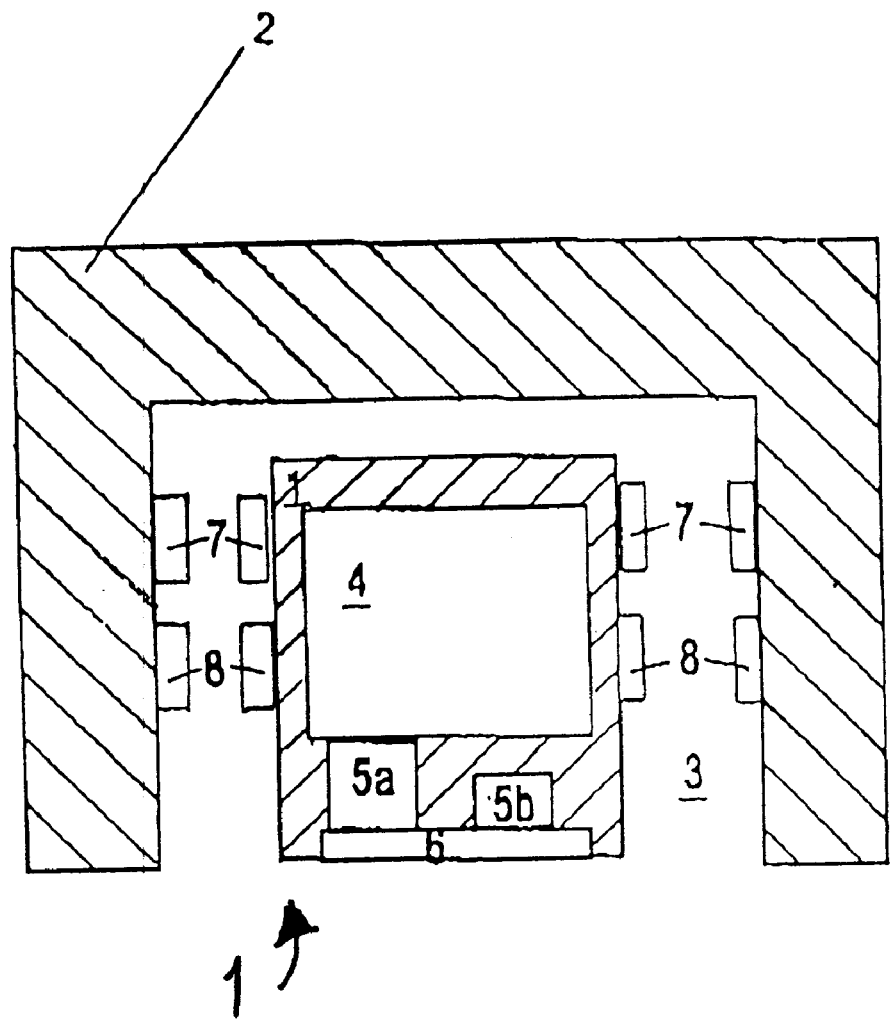
FIG. 1 is a diagrammatic sectional view of a measuring instrument according to the invention in a satellite support structure in which the entire measuring instrument including the electronics is decoupled from the satellite support structure.

FIG. 1 shows a measuring instrument 1, which is arranged in a satellite support structure 2. The satellite support structure 2 can be a yoke or gusset fixed in the satellite, such that an intermediate space 3 is formed between the satellite structure 2 and the measuring instrument 1. The shape of satellite structure 2 is arbitrarily, and for example can be rotationally symmetrical or not Measuring instrument 1 has a passive part 4, which includes, for example, a detector 5a such as a telescope, a front-end electronic unit 5b coupled to the detector 5a for output of measurement data, and a cooling unit 6 for removing heat developed in the measuring instrument. The measuring instrument 1 is supported inside satellite structure 2 by means of a control system or a bearing unit or a first positioning device 7 in a predetermined position relative to a predetermined inertial system. The inertial system depends on the application. It may be, for example, a heliocentric coordinate system in the case of measurements in the solar system. Satellite structure 2 follows measuring instrument 1 by means of conventional control components, such as gas jets, or reaction gears, which are arranged on or in satellite structure 2.

The power supply for the front-end electronic unit 5b, refereed to as the electronics hereafter, is transmitted by means of a contact-free energy transmission system 8, for example, high frequency coils.

Intermediate space 3 is dimensioned such that no contact of the measuring instrument 1 with the satellite support structure 2 can occur in the course of utilizing the control region of first positioning device 7.

Front-end electronic unit 5b of the measuring instrument contains only the functional elements absolutely necessary to be located in the vicinity of detector 5a, in order to keep the electrical power to be transmitted by means of high frequency coils 8 at a minimum. The transfer of measurement data from measuring instrument 1 to satellite structure 2 can be produced by means of optocoupler coils or the like. These transmission systems are arranged in pairs, so that the forces occurring in energy transmission or information transfer can be mutually compensated. If lower precision is acceptable, thin flexible wires may also be used for the transmission of power or transfer of information.

The first positioning device 7 is configured such that it can stabilize six degrees of freedom. Various contact-free bearing devices and support means known in the art can be used for this purpose, so that all degrees of freedom can be actively stabilized, or stabilized in part passively, depending on the respective precision required for the different degrees of freedom. In order to control the position of measuring device 1 in satellite structure 2, the first positioning instrument 7 has sensors, which measure the distances between the measuring device 1 and satellite structure 2 in the nm range. The sensors can be capacitive or inductive sensors or laser metrology sensors. These sensors serve simultaneously to supply signals to the outer satellite control circuit for detecting the control values with respect to measuring instrument 1. The external satellite control circuit effects the operation of the control means of the satellite structure 2, for example, gas jets or reaction gears, so that the satellite structure follows the motion of measuring instrument 1 within relatively high tolerances, without physical contact therewith. The control value for the bearing/positioning device of measuring instrument 1 is obtained from the data from detector 5a. The control value can thus be, for example, a star position or a point on Earth.

The control components of the first positioning device 7 can be magnetically constituted, or, in the case when smaller disturbances are to be compensated, capacitively constituted in a manner well known in the art. If measuring instrument 1 operates at cryogenic temperatures, superconductive passive bearings can be utilized in the first positioning device 7. In order to reduce the cost of the apparatus, the forces produced by the energy transmission device 8 can be used simultaneously for control with respect to individual or all degrees of freedom, by transmitting different powers from individual power transmission devices 8, with uniform total power.

If, despite the screening of satellite structure 2, disruptive moments still occur in the case of measuring instrument 1, such as moments based on gravitational forces and/or magnetic moments produced by residual dipole moments still present in measuring instrument 1, these can be substantially reduced, and also the radiation pressure produced by electromagnetic waves can be utilized for positioning the measuring instrument. Thus, for example, the irradiated power from laser interferometers utilized for positioning measurement can be used for control, whereby the laser interferometer can then operate simultaneously as a control component and an ideal location sensor. Since all sensors that can be used for positional measurement do not operate without reaction, they are operated to minimize disruptive forces by the difference method. The laser interferometer is suitable as a control component for small forces to be introduced, particularly since the disruptive force produced by a laser interferometer is extensively independent of the measurement distance.

The arrangement in FIG. 1 requires that the energy transmission device 8 must be very carefully designed in order to minimize generating disturbing forces. Furthermore, power losses in cooling unit 6 due to the radiation pressure produced by the unit 6 particularly leads to considerable forces acting on the measuring instrument, and, due to asymmetries, also leads to corresponding disruptive moments acting on measuring instrument 1.

Figure 2:
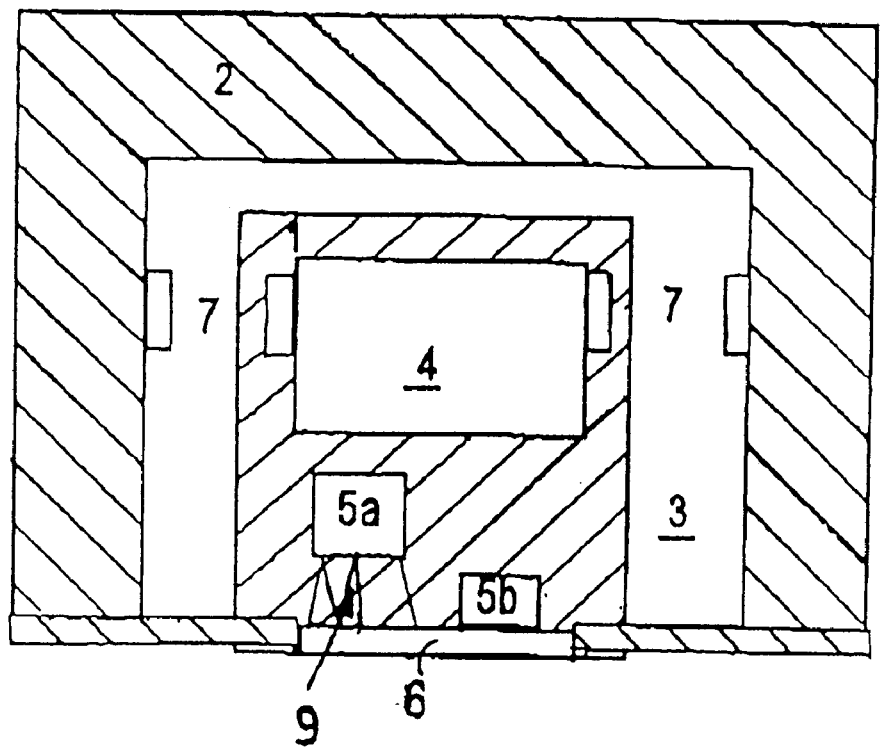
FIG. 2 shows an alternative embodiment of the measuring instrument according to the invention.

These disruptive moments can be further reduced, by the arrangement shown in FIG. 2. In this embodiment, the energy transmission and the information transfer proceed from satellite support structure 2 to the active part of measuring instrument 1, not without contact as in FIG. 1, but conventionally by means of connection lines.

FIG. 2 shows measuring instrument 1 in satellite support structure 2, such that detector 5a is separated mechanically from passive part 4, in contrast with the embodiment of FIG. 1, so that passive part 4 is arranged in a moveable manner opposite detector 5a. In this way, only the passive part 4, and not, detector 5a is mounted without contact opposite satellite support 2. For this purpose, detector 5a of measuring instrument 1 is connected with satellites support 2 by means of a second positioning device 9. In this way, the second positioning device can be attached to unit 6 or directly to satellite support structure 2. Satellite support structure 2 follows, as a slave, the movement of passive part 4 of measuring instrument 1, which has the function of a master. For this purpose, satellite structure 2 has its own control components of the usual type, for example, gas jets as in the embodiment of FIG. 1.

Alternatively, other components of the active part, such as, electronics 5b and/or unit 6, can be attached to the second positioning device 9.

The objective of the second positioning device 9 is to reduce the requirements with respect to positional precision at satellite support 2. This is achieved according to the invention in that the second positioning device 9 positions the appropriate components of the active part on the second positioning device relative to passive part 4 by a sequential control means. A suitable x-y unit can be used as the second positioning device 9 for positioning the corresponding parts of the active part, depending on the respective requirements. Alternatively, a hexapod can be used, if a three-dimensional control movement is to be obtained. With such positioning resolutions in the sub-nm range can be obtained. In order to obtain higher control precision, contact-free positioning devices can also be used for positioning the components of the active parts that are to be positioned by means of the second positioning device 9, as they are provided in the first positioning device 7. Of course, the control components in the embodiment according to FIG. 2, must introduce greater forces due to the cable connections provided therein.

For sequential control, the position of the components of the active part to be positioned relative to the passive part 4 can be detected by inductive and capacitive sensors. Alternately, or additionally, conventional simple quadrant detectors can be utilized, with which the excursions of a weak light beam reflected by passive part 4 are measured. In the case of high-precision requirements in the pm range, a laser metrology system can be used for establishing the position of the active part relative to the passive part 4.

If only detector 5a is disposed on second positioning device 9, the detector heat can be dissipated, by means of flexible strips.

Essentially only gravitational forces and smaller Lorentzian forces, (in the case of electrostatic charges on the surfaces of measuring instrument 1), act on the passive part 4 of the measuring instrument 1, which substantially determine the measuring precision of the arrangement shown in FIG. 2. If residual dipole moments should still be present on passive part 4, the magnetic fields operating on measuring instrument 1, which arise, for example, due to an external magnetic field and/or by fields produced in the satellite itself, can be measured. These can be compensated, at least locally, by suitable means, such as coil arrangements. By these provisions, the requirement for an extensively undisturbed initial movement of measuring device 1 can be still better satisfied on the basis of the further reduction of disruptive forces and moments that are obtained in this way. Limits are placed here, of course, by the obtainable precision by which detector 5a follows the movement of passive part 4.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A positioning system for a high precision measuring instrument on a satellite, said positioning system comprising a support structure secured to the satellite, said precision measuring instrument being freely movable with at least one degree of freedom within a space provided in the satellite support structure, and a first positioning device operatively coupling said precision measuring instrument and said satellite support structure, said measuring instrument producing signals which cause the first positioning device to produce movement of said measuring instrument to inertially align said measuring instrument with a target and to produce movement of said satellite support structure to follow the movement of said measuring instrument.

2. A positioning system as claimed in claim 1, wherein said measuring instrument comprises a passive part and an active part, said passive part being freely movable in said at least one degree of freedom, said active part being rigidly connected to said satellite support structure, said satellite support structure, following movements of said passive part.

3. A positioning system as claimed in claim 2, further comprising a second positioning device on said active part to follow the movements of said passive part and impart said movements to said satellite support structure.

4. A positioning system as claimed in claim 1, wherein the first positioning device provides contactless coupling between the satellite support structure and the measuring instrument.

5. A positioning system as claimed in claim 4, comprising contactless energy transmission means between the measuring instrument and the satellite support structure.

6. A positioning system as claimed in claim 5, wherein said energy transmission means is constructed to produce forces between the measuring instrument and the satellite support structure during energy transmission which are mutually compensated.

7. A positioning system as claimed in claim 5, wherein said energy transmission means is constructed to be operative when forces are developed between the measuring system and the satellite support structure during energy transmission so as to utilize the forces to move the measuring instrument in said at least one degree of freedom of movement thereof.

8. A positioning system as claimed in claim 2, comprising means for applying radiation pressure produced by electromagnetic waves to said measuring instrument for positioning the measuring instrument to overcome small disruptive forces therein.

9. A positioning system as claimed in claim 8, comprising sensors for detecting the relative position of said measuring instrument and said satellite support structure, said sensors producing forces which are utilized to position said measuring instrument.

10. A positioning system as claimed in claim 2, comprising compensation coils for substantially compensating forces produced by a magnetic field measured in said measuring instrument.

* * * * *

UNITED STATES PATENT AND TRADEMARK OFFICE
Certificate

Patent No. 6,409,125 B1

Patented: June 25, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jörck Hartmut, Wiemersdorf, Germany; and Johann Ulrich, Salem, Germany.

Signed and Sealed this Fourth Day of November 2003.

CHARLES T. JORDAN
*Supervisory Patent Examiner*
Art Unit 3600